United States Patent [19]
McAtee et al.

[11] Patent Number: 5,301,320
[45] Date of Patent: Apr. 5, 1994

[54] WORKFLOW MANAGEMENT AND CONTROL SYSTEM

[75] Inventors: John D. McAtee, Shrewsbury; Stephen M. Kennedy, Hudson; Paul J. Piccolomini, Fitchburg; Paul J. Cerqua, Chelmsford, all of Mass.

[73] Assignee: Digital Equipment Corporation, Maynard, Mass.

[21] Appl. No.: 722,691

[22] Filed: Jun. 28, 1991

[51] Int. Cl.⁵ .............................. G06F 9/00; G06F 9/40
[52] U.S. Cl. ............................... 395/650; 364/DIG. 1; 364/281.3; 364/281.8
[58] Field of Search ...................... 395/600; 364/281.3, 364/281.8, DIG. 1

[56] References Cited

U.S. PATENT DOCUMENTS 4,356,546 10/1982 Whiteside et al. .................. 364/200
4,845,739 7/1989 Katz ...................................... 379/92

OTHER PUBLICATIONS

Milan Milenkovic, "Operating systems concepts and design", 1987, 111-116, McGraw Hill.

Primary Examiner—Gareth D. Shaw
Assistant Examiner—A. Katbab
Attorney, Agent, or Firm—Cesari and McKenna

[57] ABSTRACT

Methods and apparatus for defining, executing, monitoring and controlling the flow of business operations. A designer first defines a workflow by providing a template of business activities that expresses the manner in which these activities relate to one another. The system orchestrates performance of the tasks in accordance with the template; in so doing, it integrates various types of application software, and partitions tasks among various users and computers.

16 Claims, 5 Drawing Sheets

WORKFLOW MANAGEMENT AND CONTROL SYSTEM

BACKGROUND OF THE INVENTION

A. Field of the Invention

The present invention relates to automated processing of business tasks and, more specifically, to a generic computer system that can be configured to define, execute, monitor and control the flow of business operations.

B. Description of the Related Art

The operation of a business can be viewed as an organized sequence of activities whose ultimate purpose is to produce a product or provide a service; this end result may be termed a "goal". Each business activity in the sequence involves performance of one or more items of work that bring the business one step closer to completion of the goal. Activities may be strictly ordered with respect to one another, conditionally ordered or completely unordered; they may be automated, partially automated or performed manually; and may be performed using resources within or outside the business.

In a large class of businesses, individual work items progress through the sequence of activities until they have been transformed into a finished item; that is, until the ultimate goal is achieved. Hereafter, such work items are referred to as "works in process", or WIPs, and the path followed by a WIP is termed a "workflow". For WIP-oriented businesses, resource and task management can prove difficult; this is particularly so where the WIP is processed according to a predetermined sequence of activities, each of which is carried out only if appropriate conditions are met, and by different personnel or machines using different pieces of information.

Figure 1:
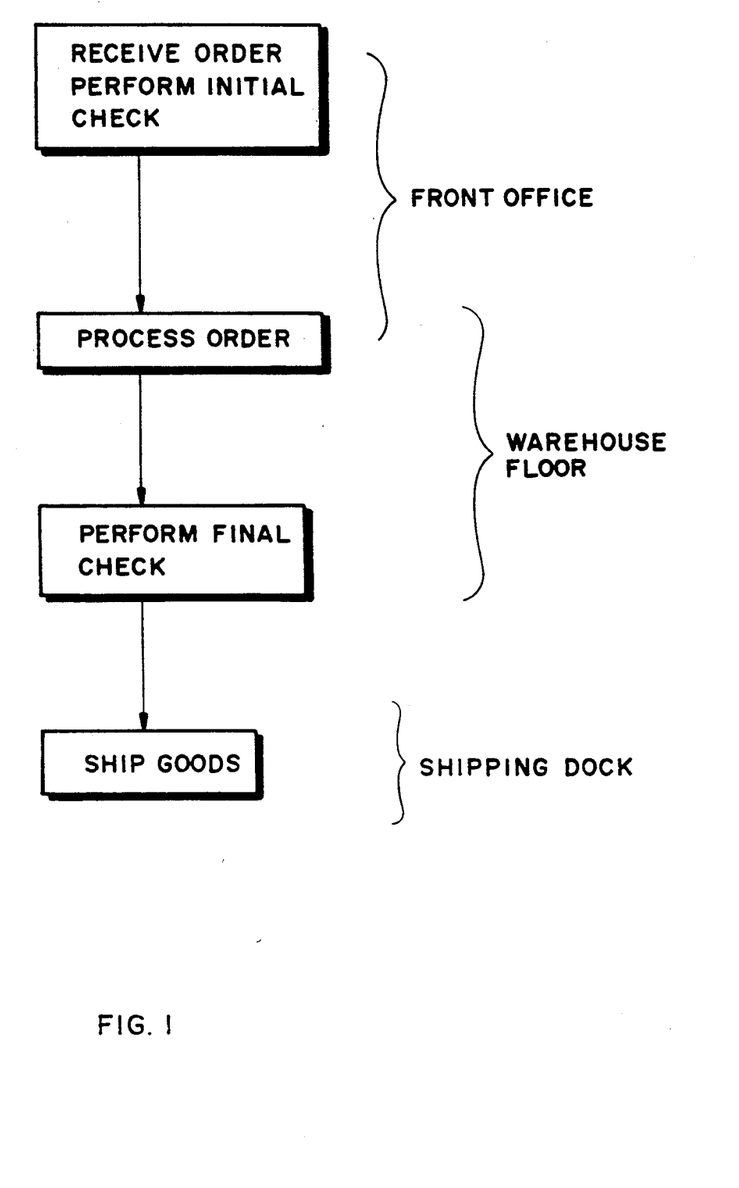
FIG. 1 is a flow diagram illustrating an exemplary business structure of a mail-order enterprise.

A useful example of such a business, and one to which we shall return later, is a mail-order enterprise. For purposes of this example, suppose that the business is divided into three departments: the front office, the warehouse floor, and the shipping dock. These departments execute the four main business activities: receiving and performing the initial check of an order; processing the order; performing final checks on the goods to be shipped; and actually shipping the goods. Such a scheme is illustrated in FIG. 1.

The initial order check consists of verifying the customer's credit rating, and determining whether the goods are available from inventory; these activities are performed sequentially. Processing the order consists of filling the order, an activity which involves the three parallel subactivities of sending a label, box and the merchandise to shipping; locating and packaging the ordered goods; and preparing an invoice, which involves the two sequential subactivities of generating an invoice and printing the invoice. The final-check activity involves inspection of the order, and is followed by the activity of shipping.

In this example, or processing path, can involve a number of separate resources: different personnel in each of the three departments, each group beyond initial intake requiring status information regarding the progress of the previous group before activity can be commenced; different computational resources (e.g., a third-party credit verification database, inventory-control equipment and spreadsheet and/or word-processor application programs); and different criteria governing when various activities can begin.

Because of the variety of resources and the necessity of maintaining a relatively fixed business procedure, integrating these different resources can create dynamic logistical problems that interfere with efficient operation. Such problems arise from the need for communication among resources; the necessity of selectively combining resources from physically disparate locations (e.g., it may be necessary for the same operator to access different computer terminals to perform the credit check and then print a label); bottlenecks that reflect inefficiencies in resource allocation; and the need to segregate different activities for efficiency or security reasons (e.g., it may not be desirable for the same operator to print the label and also perform the credit check).

Unfortunately, while an ordinary computer system of sufficient capacity may be capable of executing most of the mail-order steps described above (using several application programs and with varying degrees of human and mechanical assistance), it is, at present, quite cumbersome to custom-tailor such a system to efficiently accommodate the specialized pattern of activities that defines the workflow; and even if such a "meta-system" can be configured, it is likely to be very difficult to modify should a change in workflow procedure become desirable.

DESCRIPTION OF THE INVENTION

A. Summary of the Invention

We have developed a generic computer system and architecture that can be straightforwardly configured to accommodate a user-defined workflow. A designer first defines a workflow by providing the system with a template of business activities that expresses the manner in which these activities relate to one another. Our system can integrate various types of application software, and is capable of partitioning tasks among various operators, computers and computer terminals as specified by the designer.

After the designer completes the template and the system is fully operational, users of the system, and the system itself, perform the various business tasks that define the work-flow in accordance with the workflow template. The configured system supervises and orchestrates performance of these tasks so that they occur in the specified order.

The system provides a new approach to the creation of large application systems by representing workflow tasks in a fully modular fashion. That is, an identifier for each task, along with a specification of the activities necessary for its completion and the manner in which the task relates to other tasks, are stored as a discrete, self-contained package. This allows the designer to alter the order and relationships among tasks without reconfiguring the entire workflow system, a considerable chore that would be necessary if the workflow were to be programmed in the traditional, linear fashion. Consequently, workflow design can proceed in an evolutionary fashion, with the designer altering the workflow as actual operations reveal bottlenecks or other inefficiencies.

The design of the system stems from our recognition that workflows can be defined by seven key relationships among activities:

1. Connectivity: describes the precedence relationship or the manner in which activities are interrelated and the order in which they occur.

2. Place: defines the place (e.g., the particular CPU on a network) at which a task is performed.

3. Timing: determines when activities begin, how long they persist, and when termination is appropriate.

4. Value: quantitatively describes the importance of a particular activity relative to other activities, thereby establishing priority relationships among activities.

5. Grouping: some activities can or must have some type of aggregative relationship, such as synchronization, sequential grouping or parallel grouping.

6. Scaling: describes the manner in which steps or activities can be decomposed into more granular tasks or recomposed into higher-level steps.

7. State: defines the status of a particular activity, WIP or of the workflow as a whole.

When installed in a computer, the programming of the present system resides, in a functional sense, above the computer's operating system (which controls basic hardware activities such as storage and retrieval of data) and below user-supplied application software, but is independent of both. System operation is driven by the occurrence of specific events that relate to the business process; these events can be "declared" by application software or otherwise recognized by the system during control operations.

The core system is organized into four components, which are implemented on and processed by a general-purpose computer: the Controller, the Controller Services Interface, the Manager Utility and the Manager Services Interface. Each of these systems is resident in permanent electronic storage facilities, and parts thereof are selectively retrieved and introduced into the volatile memory of the computer to facilitate processing. Although the system can be straightforwardly installed on a variety of computer systems, the primary criterion being sufficiency of processing power and speed to support operation of the four system components (although it is not necessary for all components to reside on a single machine) and accommodate the necessary application programs, the distributed nature of most workflow activity favors use of multi-user or network systems that allow both simultaneous processing and communication among user locations. Furthermore, because of the ability of the system to group execution of different activities, it is possible to use "parallel-processing" hardware for more efficient operation.

To configure the system for a particular application (after the components have been installed within the computer hardware), the designer first defines the workflow by decomposing the business process into an ordered description of discrete goals. Each goal can represent the completion of a business task or activity, or the occurrence of a specific business-related event. We define business goals that involve a single activity as "primitive" goals, and those specifying simultaneous or sequential execution of multiple activities as "compound" goals.

After constructing the workflow, the designer interacts with the Manager Utility (M/U) to create a workflow template. In operation, the M/U performs in a manner analogous both to word-processing and graphical editors; the designer establishes a workflow definition, against which work is ultimately processed, and sets system parameters. The M/U allows the designer to define the manner in which WIPs are created and identified, as well as the manner in which they will be used to control workflow operation.

The Controller supervises access to application programs, and assigns work to WIP-processing programs, written by the designer, hereafter referred to as "software agents", or SWAs. SWAs are scheduled by and executed under the control of the Controller and Controller Services Interface (CSI) components; SWAs can process WIPs directly, without communication with system users. The Controller is, in effect, the system's "engine"; as WIPs are created, the Controller processes them through the workflow activities as directed by the template (which was constructed by the designer using the M/U). After a WIP undergoes a template-specified task, the Controller proceeds to process the WIP according to the next task by identifying and activating the appropriate resource or resources.

More specifically, the SWA notifies the Controller, through the CSI, that processing of the WIP has been completed. Then, in accordance with restrictions contained in the template, the Controller identifies the next task or tasks (if any), locates the best available resource to process such task or tasks, and queues the WIP to that resource for processing. The CSI is a set of straightforward run-time routines and a server that facilitate communication between the Controller, the SWAs and other application programs. The server acts as a front-end multiplexer for the Controller by receiving all communications directed thereto and selectively transmitting them to the Controller in accordance with availability and priority. The run-time routines establish links to SWAs and communication agents (discussed below) as appropriate during goal processing. The decision to separate communications from control operations represents a design choice; we have found that the increase in Controller processing efficiency achieved by eliminating its communication overhead justifies this separation.

The Controller can be apprised in two ways that a task has been completed. For automated tasks performed directly by SWAs, the CSI has invoked the executing program, so completion of processing of a WIP through a SWA suffices to signal conclusion of the corresponding task for that WIP. In other cases, however, the state of processing may not indicate the status of a task. For example, the task may be completed manually by business personnel who do not directly interact with any system component, or can involve the use of application programs over which the Controller does not have plenary command. In these situations, the event representing completion of the task is "declared" to the Controller, either by an application program (using a special command) or directly by the user through the M/U. Thus, in the above-described mail-order business, a fully automated credit check might be performed by a SWA that accesses a third-party database and evaluates the obtained data (in which case an event need not be declared), while order inspection is necessarily a manual activity requiring user intervention (and necessitating event declaration).

Event declarations are facilitated by programs hereafter referred to as "communication agents", or CMAs. These programs establish communication channels between the CSI and application programs or users, interact with users (either directly or through application programs) and allow users to notify the CSI of task completion.

After completion of a goal with respect to a particular WIP, the Controller selects the next goal or goals to be processed for the WIP based on considerations of connectivity, place, timing, value and/or class of WIP or resource.

B. BRIEF DESCRIPTION OF THE DRAWINGS

The foregoing discussion will be understood more readily from the following detailed description of the invention, when taken in conjunction with the accompanying drawings, in which.

C. DETAILED DESCRIPTION OF THE INVENTION

1. Defining a Workflow

Figure 2:
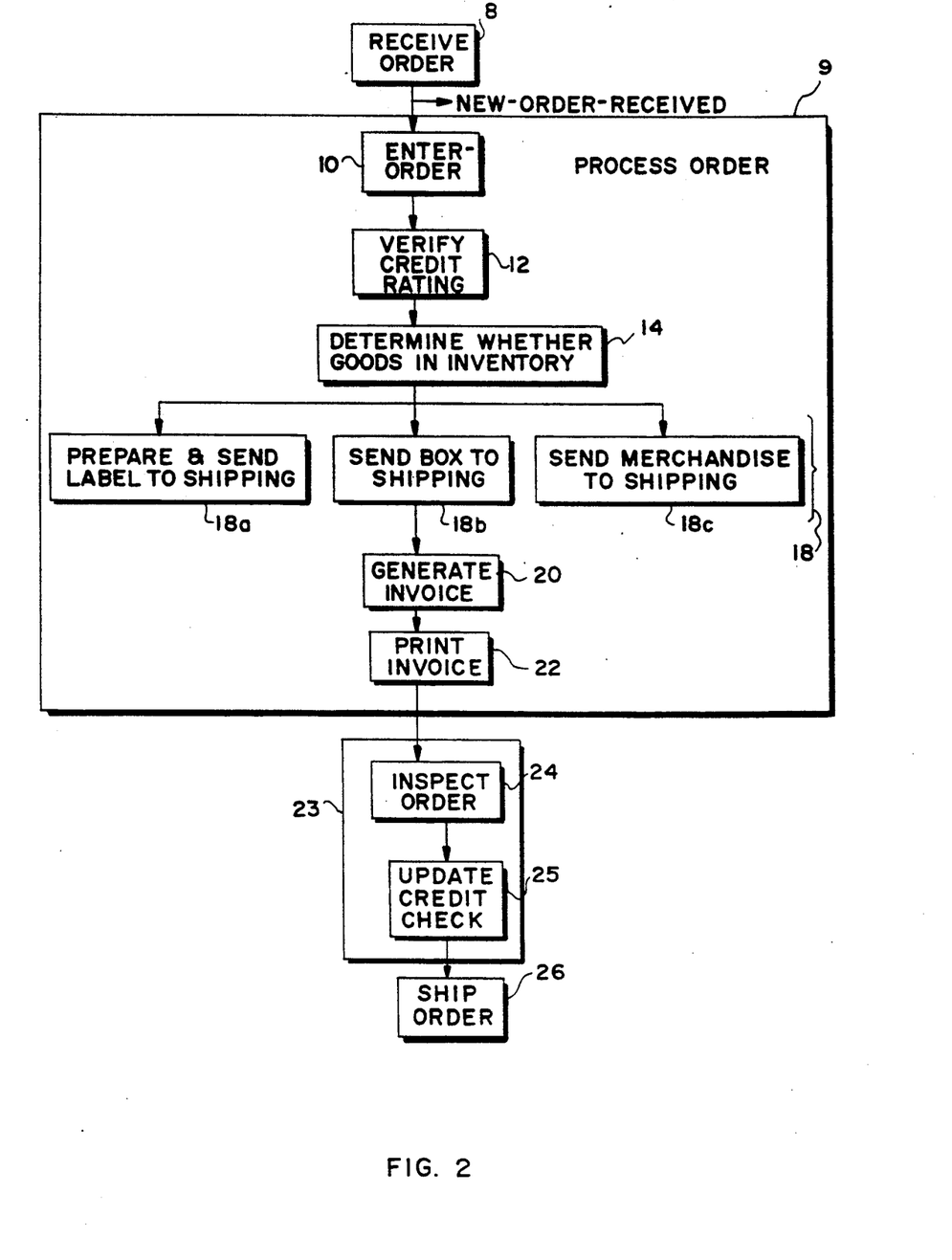
FIG. 2 is an illustration of a representative workflow.

Before accessing the workflow system of the present invention, a designer first breaks down the sequence of business operations into a series of goals, each of which represents a discrete business activity; each goal is then further decomposed into the tasks necessary for its accomplishment. FIG. 2 illustrates the manner in which the above-described mail-order enterprise can be represented as a series of goals. The first item 8 represents an event goal. Upon the occurrence of a triggering event (namely, entry of a new order) the Controller WIP through the workflow. (In practice, where large number of orders are to be expected, each WIP would most likely contain an ascending numerical component as a means of uniquely distinguishing the WIP.) In FIG. 2, the workflow to be processed upon declaration of Receive-Order (item 8) is represented as two compound goals 9 and 23 (called Process-Order and Final-Check, respectively) and the primitive goal 26.

The size of a compound goal (i.e., the number of component goals it specifies) is determined by the designer, and can stem from a variety of considerations. If a series of sequential tasks tend to be performed in association with one another, so that in altering the workflow the designer would be likely to shift, as a group, the relationship of these tasks to other tasks, convenience may dictate "packaging" them as a single compound goal consisting of multiple primitive goals. If multiple parallel tasks must all be completed before the next goal can become active, the parallel tasks are typically gathered into a single compound goal.

Thus, in FIG. 2, goals 8, 10, 12, 14 are both primitive and sequential; a goal that sequentially follows a previous goal is said to "depend" on that previous goal (so that goal 10 depends on goal 8, goal 12 on goal 10, and goal 14 on goal 12).

The three goals 18a, 18b, 18c collectively form a compound goal 18 that depends on goal 14, while the next goal 20 depends on the compound goal 18, and the next goal 22 on goal 20. Goals 10, 12, 14, 18, 20 and 22 collectively form compound goal 9, Process-Order. Goals 24 and 25 are primitive and dependent, and collectively form a compound goal 23, Final-Check.

The designer develops this workflow using the M/U, which operates like an editing facility. The function of the M/U is to generate a database of workflow descriptions that includes goals, relationships among goals and characteristics associated with each goal. These are interpreted and processed by the Controller during system operation to implement and enforce the workflow.

The M/U interacts with the user to obtain certain key pieces of information relating to each goal. This information is entered into fields that define a data structure for that goal, and the set of data structures for all goals is organized into a table. This table is referred to as the "workflow definition database". The fields for each goal include:

GOAL NAME: An alphanumeric string uniquely identifying the goal.

TYPE OF GOAL: As more fully described below, a goal can be categorized as a "task" goal, an "event" goal, a "group" goal or a "sequence" goal.

RELATED GOALS: If the goal is a compound goal, the names of all other goals that define the compound goal (which may itself contain compound goals).

TRIGGER GOAL: If the goal is an event goal, the name of the goal triggered by occurrence of the event.

NODES: Lists the system CPUs that are operative during the goal activity. This field allows the Controller to maintain control over workflow resources by allowing the goal to be processed only on specified CPUs. If no data is entered into this field, the system imposes no node restrictions.

PRIORITY: Goals operating in parallel can make overlapping demands on system resources. The priority factor provides data with which the Controller can allocate resources according to the importance of accomplishing a particular goal. In the preferred embodiment, priority is indicated by a numerical weight ranging from 1 to 32.

STATUS: A goal can be ENABLED or DISABLED. In the latter case, workflow execution is suspended until the goal is again ENABLED. A goal is typically DISABLED if execution of the related SWA results in an error condition.

TIME QUALIFIERS: A goal can be restricted to running (i.e., remain "valid") only during particular times during the day, and can be given a maximum allowed execution time.

The designer enters data into each of the set of fields corresponding to each goal; the graphical appearance of the prompts and the nature of the designer's interaction with the M/U are not critical, and a wide variety of suitable approaches are readily implemented by those skilled in the art. In our preferred embodiment, the M/U offers both a graphical mode and a command-driven mode, allowing the designer to enter goals as a series of boxes that resemble the configuration shown in FIG. 2, or as a sequence of commands. Regardless of the details of data entry, the pattern of the designer's interaction with the M/U initially involves entry of goals and goal information into the workflow definition database. Thereafter, the designer creates the various computer programs (i.e., SWAs and CMAs) that facilitate or actually carry out these tasks.

A "task" goal is one that is fully executed by a SWA within the system. An "event" goal relates to an activity that occurs outside the system, the completion or which is made known to the system by a CMA, which may trigger processing of another, specified goal. Thus, item 8 denotes an event goal which, upon the occurrence of an event, initiates processing by the system. That event represents entry of new order information by a human operator, which apprises the system that an order has been received. More specifically, the designer has written a CMA that awaits a request for order entry by an operator and, upon receipt of such a request, causes the Controller to create a WIP (according to steps discussed in further detail below) and execute of subsequent goals.

The first goal entered, Process-Order, is a compound "sequence" goal that represents a large portion of the workflow, and which will contain subordinate goals that further define the workflow activities. The RELATED GOALS field for Process-Order would contain the names (at the next-highest level of generality) of all the goals shown in FIG. 2 as being within Process-Order.

Goal 10 involves entry of customer information into, for example, a commercial or custom-designed data-entry program. As discussed more fully below, the user enters the data and, upon completion of this activity, the CMA declares an event to the CSI indicating that the data has been entered. Thus, this goal represents an event goal, because the system is apprised of the completion of information entry. If goal 12 involves a fully automated credit check (as is common in many mail-order businesses), this step is represented as a task goal, and is fully implemented by a SWA. Goal 14 requires human activity (assuming a physical search to be necessary), and is therefore an event goal. Once again assuming the need for physical transfers and acknowledgments of arrival in the shipping department, goals 18a, 18b and 18c are event goals that make up the compound definition of goal 18.

Partial data structures for goals 8, 10, 12, 14, and 18 during the time the operator keys in the order information (for purposes of this example, on CPU 1 of the system network) are shown in the following table:

TABLE 1

|  | Goal 8 | Goal 10 | Goal 12 | Goal 14 | Goal 18 |
| --- | --- | --- | --- | --- | --- |
| GOAL NAME | Receive-Order | Enter-Order | Verify-Credit-Rating | Determine-Whether-Goods-In-Inventory | Prepare-Order |
| TYPE OF GOAL | Event | Event | Task | Event | Event |
| RE-LATED GOALS | — | — | — | — | Prepare/Send-Label, Send-Box, Send-Merchandise |
| TRIG-GER GOAL | Process-Order | — | — | — | — |
| CODES | CPU1 | CPU1 | Any | Any | Any |

WIPs are also described by data structures containing information fields; these are generated by the Controller as WIPs are created, and stored in a database. The fields for each WIP include:

WIP IDENTIFIER: This is assigned by the Controller (in accordance with instructions issued by a CMA or SWA), or specified by the user when the WIP is created.

TRIGGERING EVENT: The event which, when declared, results in creation of the WIP and initiation of goal processing for that WIP.

TRIGGER GOAL: Some, though not all, event goals have associated trigger goals. If the goal following an event goal lies at the same hierarchical level as the event goal (e.g., it is a primitive goal that follows a primitive event goal in sequence), no trigger goal is stated. On the other hand, if completion of the event goal results in the initiation of new processing at a different hierarchical level (e.g., processing of a new compound goal), the next goal is entered as the trigger goal. More specifically, the trigger goal is the first goal processed as a result of the triggering event, expressed at the highest level of generality (i.e., if the first goal is part of a compound goal, this field contains the name of the compound goal).

WIP PRIORITY: For purposes of queuing WIPs to a SWA, each WIP is assigned a priority factor to indicate its importance relative to other WIPs. As with goal priorities, the weighting factor ranges from 1 to 32.

WIP-GOAL STATUS: A WIP can be ACTIVE, INACTIVE or COMPLETE with respect to a particular being processed for the WIP; accordingly, each of these designations is applied to a WIP on a per-goal basis (unlike the other fields, which apply regardless of which goal or goals are currently active for the WIP). The status conditions are used to respond to user or system inquiries regarding the WIP. The COMPLETE condition alerts an inquirer that the WIP has been fully processed through the goal that was the subject of the inquiry; the ACTIVE condition indicates that the WIP is currently being processed by the subject goal, and the INACTIVE condition indicates that the WIP has not yet been processed through this goal.

WIP STATUS: Independent of any particular goal, the WIP itself can be ACTIVE, IDLE or PAUSED. ACTIVE WIPs are those being processed at the time of the status inquiry; an IDLE condition indicates that the WIP has been fully processed, and the PAUSE condition indicates that processing has been interrupted manually.

TEMPLATE: Each WIP contains a copy of the goal-processing template relevant to that WIP. To reduce the necessary storage space, each goal contained in the WIP's template representation can be assigned a unique identification sequence or numeral, and goal information retrieved as necessary from the goal database during WIP processing.

Each WIP is generally associated with some form of application data, which can be handled in one of two ways. In the simpler embodiment, the workflow system is never exposed to the underlying WIP data. If processing of a goal requires retrieval and manipulation of the data, this is performed by the user and its completion signaled by declaration of an event. In the more complex embodiment, the WIP identifier is used to designate a data file that stores WIP data in whatever form the designer specifies. This embodiment typically requires more complex SWAs and CMAs to address and perform operations on the data.

For example, in the more complex embodiment, the WIP New-Order-Received can designate a blank business form that is represented and stored electronically. As the WIP moves through the various goals, information is entered by users (e.g., order information during activity 10) and the system (e.g., after completion of a fully automated credit check during activity 12, the form is marked to show the results).

The goal and WIP status fields allow users to query the system regarding the status of a particular activity or WIP. These inquiries are handled by the Manager Services Interface (MSI), which sorts through the relevant database fields. For status inquiries pertaining to an activity. The MSI retrieves and returns to the inquiring user the identities of all WIPs queued to that activity and the status of each such WIP; if the user's inquiry relates only to a particular WIP, the system indicates either (a) whether the WIP is ACTIVE, IDLE or PAUSED; or (b) with respect to a particular goal, whether the WIP is ACTIVE, INACTIVE or COMPLETE as to that goal.

2. Operation of the Controller and Controller Interface

As described above, the workflow is decomposed into a series of goals, and each business goal is decomposed into a series of component goals for processing. The Controller initiates and supervises processing of goals by executing or enabling use of the optimal (or available) resources (which may be human or computational). The performance or a goal-related task is initiated at the completion of a previous task, or in response to the occurrence of an event.

For each WIP, the relevant tasks (i.e., those associated with the goals listed in the WIP's data structure) are performed in sequence. Non-repetitive, sequential processing of tasks is facilitated by a logical pointer (or pointers) to the currently operative goal (or goals) in the template contained in the WIP data structure. After a SWA has finished executing a goal and the WIP has entered the COMPLETE state for that goal, or when an event indicating completion of the goal is declared, the system performs operations collectively referred to as "goal completion". These operations include advancing the pointer and evaluating the current state of processing. If the completed goal is the last component of a compound goal, the compound goal is itself considered complete.

After goal completion, the Controller determines whether further processing is necessary. If the next goal lies at a hierarchical level different from that of the just-completed goal, the Controller inspects the database to identify the next primitive item of processing. This iterative, nested process is referred to as "goal activation". Because it is necessary to refer to the goal database in order to determine the task or tasks associated with each goal (as well as the component goals associated with a designated compound goal), the system's database organization is preferably relational, allowing the logical pointer to specify goals at arbitrary levels of granularity. In the preferred embodiment, database-access programming is written in standard SQL code, allowing straightforward interface to relational database products such as RDB, Oracle and Ingres.

Since the system is organized as a database, coincident workflow executions can be accommodated in assembly-line fashion; that is, multiple goals can be simultaneously active for different WIPS (although a single CPU can process only one goal at a time). The order in which WIPs are processed for a particular goal depends on the chosen hardware implementation and may also depend on the priority associated with the WIP, as discussed below. If, for example, the system is configured to operate with parallel-processing or distributed architectures, multiple CPUs can simultaneously execute a particular SWA for different WIPs, enhancing the overall processing speed of multiple workflows commensurately.

Ordinarily, performance of any task requires execution of a SWA or a CMA; even if actual processing of the task is performed by a user outside the system environment (e.g., manually or through use of an application program that communicates with the Controller), a CMA initiates communication with the user and issues a confirmation to the Controller (via the CSI) that the task is complete.

As discussed in greater detail below, SWAs are invoked and executed by the Controller (via the CSI, which also interfaces to CMAs) to accomplish the specific tasks that lead to completion of a goal. Ordinarily, the SWA associated with a particular goal is identified by the name of that goal, enabling the CSI easily to access and activate the SWA at the appropriate point in the workflow. SWAs process WIPs, and the results of this processing can include modification of the WIP and/or production of a new WIP, in which case it is given a separate WIP identifier as discussed above. As explained previously, the workflow is executed on individual WIPs, and is repeated as necessary (and in the manner allowed by the hardware configuration) to process multiple WIPs. The way in which a particular SWA iteratively processes WIPs is illustrated by the processing loop shown in FIG. 3.

When the rate at which WIPs are available for processing by a particular SWA exceeds the rate at which the SWA can process an individual WIP, the WIPs must be queued. Queuing is managed by the Controller, and processing is most straightforwardly performed on a FIFO basis; however, WIP priority values can also be used to determine the order in which queued WIPs are processed.

With respect to a particular WIP, only SWAs relating to the current goal or goals are allowed to process the WIP. SWAs and system resources belonging to other goals remain unused for that WIP (e.g., users cannot process the WIP on system CPUs or application programs belonging to goals other than the current goal). A goal is considered completed for a particular WIP when the associated SWA has fully performed the automated processing representative of the task; completion of goals and triggering of new goals will be discussed below.

SWAs can be written in any computer language, so long as they are capable of complying with certain conventions associated with the present system. These conventions consist of a set of status messages that are generated by the SWA and communicated to the CSI to allow the Controller to supervise processing. The CSI establishes a communication channel or link between itself and the SWA upon issuance of a request by an activated SWA, which can reside at any logical system location. It then proceeds to execute the SWA according to the processing loop shown in FIG. 3.

The status messages generated by the SWAs include:

CSI$SWA_OPEN_CTRLR_COMM: This message is issued by the SWA as a communication request to the CSI. A response by the CSI, which the SWA is configured properly to receive, indicates that communication has successfully been established.

CSI$SWA_RECEIVE_COMMAND: This message indicates successful initialization of the SWA, and that the CSI can now issue commands and data (in the form of WIP identifiers) to the SWA for processing. The CSI responds by providing commands and WIP identifiers to the SWA.

CSI$SWA_START_WIP_PROCESSING: This message indicates the onset of processing by the SWA.

CSI$SWA_END_WIP_PROCESSING: This message indicates that the WIP has been processed.

CSI$SWA_RELEASE_COMMAND: This message indicates to the Controller (via the CSI) that the current command is no longer being processed.

CSI$SWA_CLOSE_CTRLR_COMM: This message closes communication between the CSI and the SWA.

CSI$SWA_REQUEST_GOAL_PROCESSING-(argument): This message requests the Controller to process the goal identified in the argument. It can be used to facilitate conditional branching, as discussed below.

Figure 3:
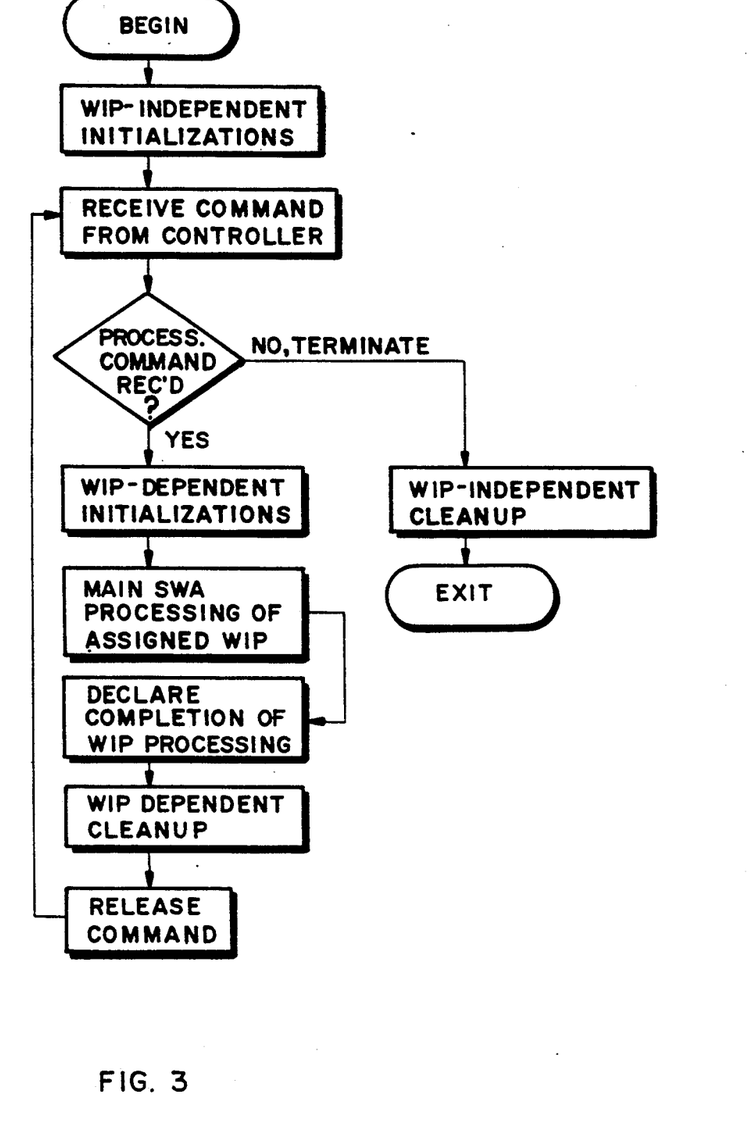
FIG. 3 depicts a processing loop representative of the manner in which a SWA iteratively processes WIPs.

The CSI uses these messages to monitor the progress of the SWA as it traverses the processing loop shown in FIG. 3. The foregoing messages are interpreted by the CSI during this loop as follows:

Communication between the CSI and the CMA is facilitated by another set of message-passing routines, some of which are analogous to the SWA messages, and include:

CSI$OPEN_CTRLR_COMM: This message is issued by the CMA as a communication request to the CSI. A response by the CSI, which the CMA is configured properly to receive, indicates that communication has successfully been established.

CSI$DECLARE_EVENT(argument): This declaration indicates to the CSI that the work associated with the event has been completed. The argument contains the name of the processed event goal and WIP.

CSI$CLOSE_CTRLR_COMM: This message closes communication between the CSI and the CMA.

The interaction between the Controller and an external activity is illustrated as follows. In FIG. 2, entry of

TABLE 2

| SWA Message | Description |
| --- | --- |
| CSI$SWA_OPEN_CTRLR_COMM ↓ | The SWA process has been invoked, has performed any necessary initializations, and now establishes communication with the Controller. |
| →CSI$SWA_RECEIVE_COMMAND ↓ | The SWA receives a processing command from the CSI. |
| CSI$SWA_START_WIP_PROCESSING ↓ | The SWA enters this state as soon as it is ready to begin processing. |
| CSI$SWA_END_WIP_PROCESSING ↓ | The SWA has completed the assigned processing. |
| CSI$SWA_RELEASE_COMMAND ↓ | All "clean-up" operations have been performed, and the SWA is available to process another WIP. |

As shown in Table 2, after completing one WIP assignment, the SWA notifies the CSI that it is available for a new assignment before looping back up to receive a new processing command. When processing of a WIP is completed, as reflected by the CSI$SWA_END_WIP_PROCESSING message, the Controller performs goal completion.

However, not all tasks can be fully executed internally using SWAs. If, for example, user action is necessary to complete a goal, the goal is an "event" goal and progress through the workflow depends on declaration of the appropriate event. In such a case, the user interacts in a manner appropriate for the application to indicate that work associated with the event has been completed. At this point, the CMA declares an event to the Controller, which performs goal completion.

Usually, CMAs (rather than SWAs) create WIPs, and are programmed to create or obtain the WIP identifier and priority. The CSI is apprised by the CMA that a WIP is being created, and the CSI then passes the information to the Controller, enabling the Controller to create a data structure for the WIP; the CSI obtains the WIP and priority from the CMA, and generates the remaining WIP information based on the currently active workflow template. All of this information is entered into the new WIP data structure.

new order information results in declaration of the event Receive-Order and creation of the WIP New-Order-Received. Completion of goal 8, indicated by the event declaration, initiates execution of the compound goal Process-Order. The Controller evaluates which goal or goals may be activated as a result of the event declaration, advances the WIP template pointer to the first primitive goal 10 (Enter Order), and proceeds to execute this goal. From the system's viewpoint, goal 10 consists of facilitating the user's entry of data and declaring the event Enter-Order to inform the Controller that goal 10 has been achieved.

In actual operation, a pre-programmed CMA enables the user's CPU and initializes the data-entry program at that CPU. The user then interacts directly with the data-entry program, without communication to the workflow system. When the user signs off, the CMA issues a CSI$DECLARE_EVENT message to the CSI, where the argument is Enter-Order (the event representing the work just completed by the user). When the Controller receives this message via the CSI, it updates the WIP, and proceeds to perform goal completion.

Once again, the degree of control the system exerts over user data (i.e., the customer information entered via the data-entry program) represents a design choice.

System operation can proceed in a manner involving no interaction with the user's data. In this case, updating the WIP consists essentially of advancing its template pointer and revising its status; if customer information is to be modified or other data generated during the course of the workflow, users are responsible for data access and entry. If on the other hand, system is to manage user data, the CMAs contain file-management capability so that data can be brought directly to the attention of the user or modified internally.

Activity processing is obviously simpler if all tasks within a compound goal are self-executing, and all operations occur internally within the workflow system. This can be true of activity 12 in FIG. 1, which, in our example, consists of the following tasks: accessing and establishing communication with a third-party credit-rating database; providing appropriate information to the database for evaluation; receiving credit information from the database; interpreting the data; and, if the customer's credit is satisfactory, generating a CSI$-SWA_END_WIP_PROCESSING message. Receipt of this message by the Controller is interpreted as completion of goal 12. All of these tasks can be performed directly by one or more SWAs and CMAs; however, if the system does not access user data, the user provides the necessary customer information directly.

If the customer fails to meet the minimum credit requirements, the system can be configured to respond in any of several ways. One approach is to provide for conditional processing within the structure of the workflow, using the CSI$SWA_REQUEST_GOAL_PROCESSING(argument) message, thereby causing transfer of goal execution from one sequence of goals to another (which can itself lead back into the initial sequence via a second CSI$SWA_REQUEST_GOAL_PROCESSING(argument) message).

The system's database organization allows use of the invention in conjunction with a number of different hardware and software configurations. In its simplest form, the system is utilized with a single processor having one or more terminals. As each goal is completed, processing proceeds to the next activity. If the hardware system offers multitasking capability, processor resources can be partitioned to accommodate execution of multiple workflows in different states of processing. The present invention can also be configured to operate with distributed or parallel-processing architectures. For example, individual processors in a multiprocessor system can each be allocated to a single goal, with the Controller (itself run by a single processor) disseminating WIPs to the different system components for concurrent processing.

Figure 4:
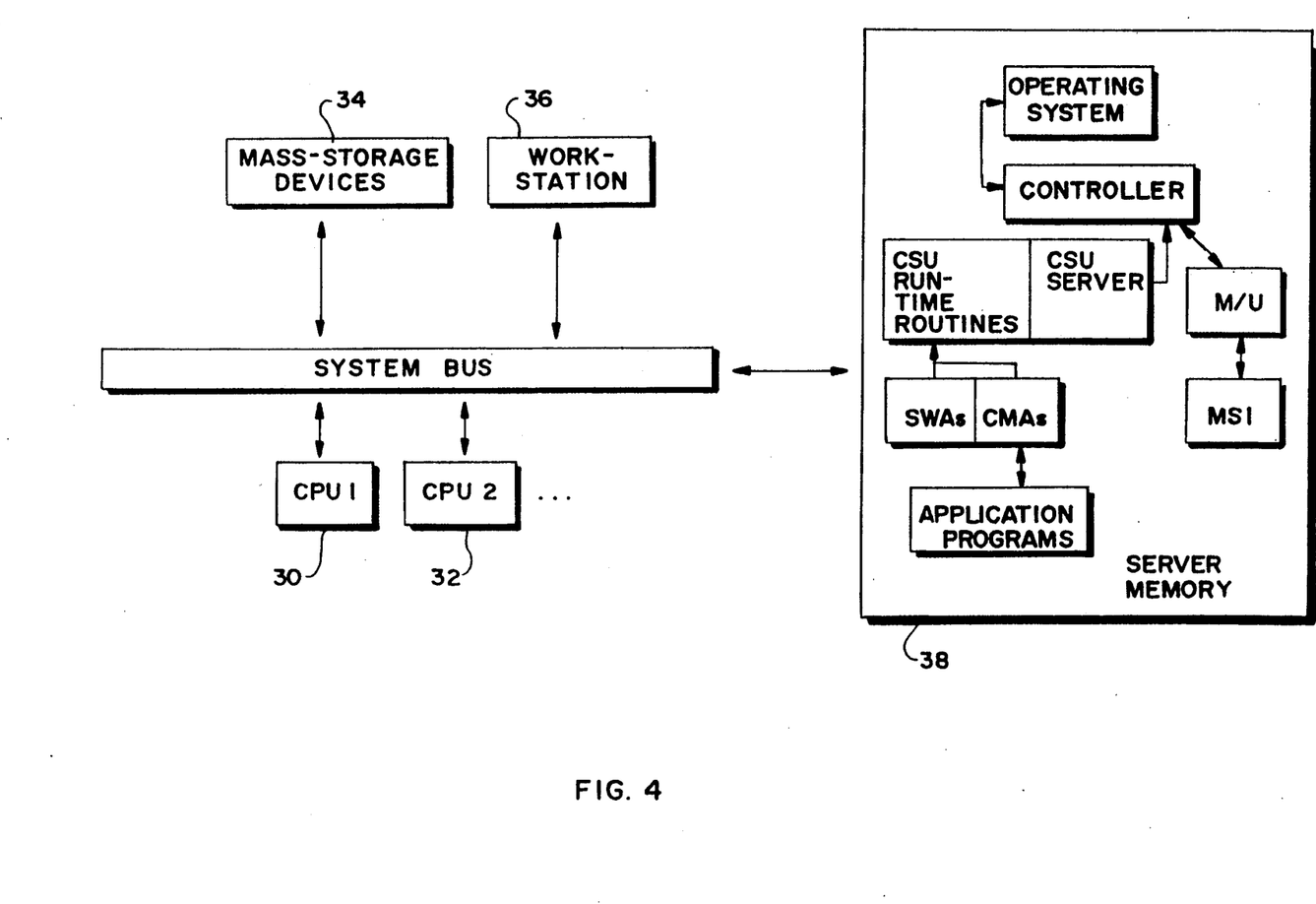
FIG. 4 is a block diagram illustrating a representative system organization.

Such a system is illustrated in FIG. 4, which shows the manner in which system components interact. The system contains a series of CPUs denoted generically by reference numerals 30 and 32; one or more mass-storage devices 34, which store data files, operating systems and all workflow-system components; a workstation 36, which is a separate CPU (or a set of parallel CPUs) responsible for executing and managing all system components; and the server's main volatile memory 38, which contains all workflow-system components during operation as well as the operating system necessary for hardware operation. The components appearing in server memory 38 are copied therein from mass-storage devices 34 during initialization and processing, as appropriate, under the direction of server 36.

During system operation, users on the CPUs interact with application programs or the MSI as goals are processed. Server 36 executes SWAs and responds to event declarations until each WIP has been processed through all of the goals contained in its template, as well as any goals added thereto by conditional branching.

Figure 5:
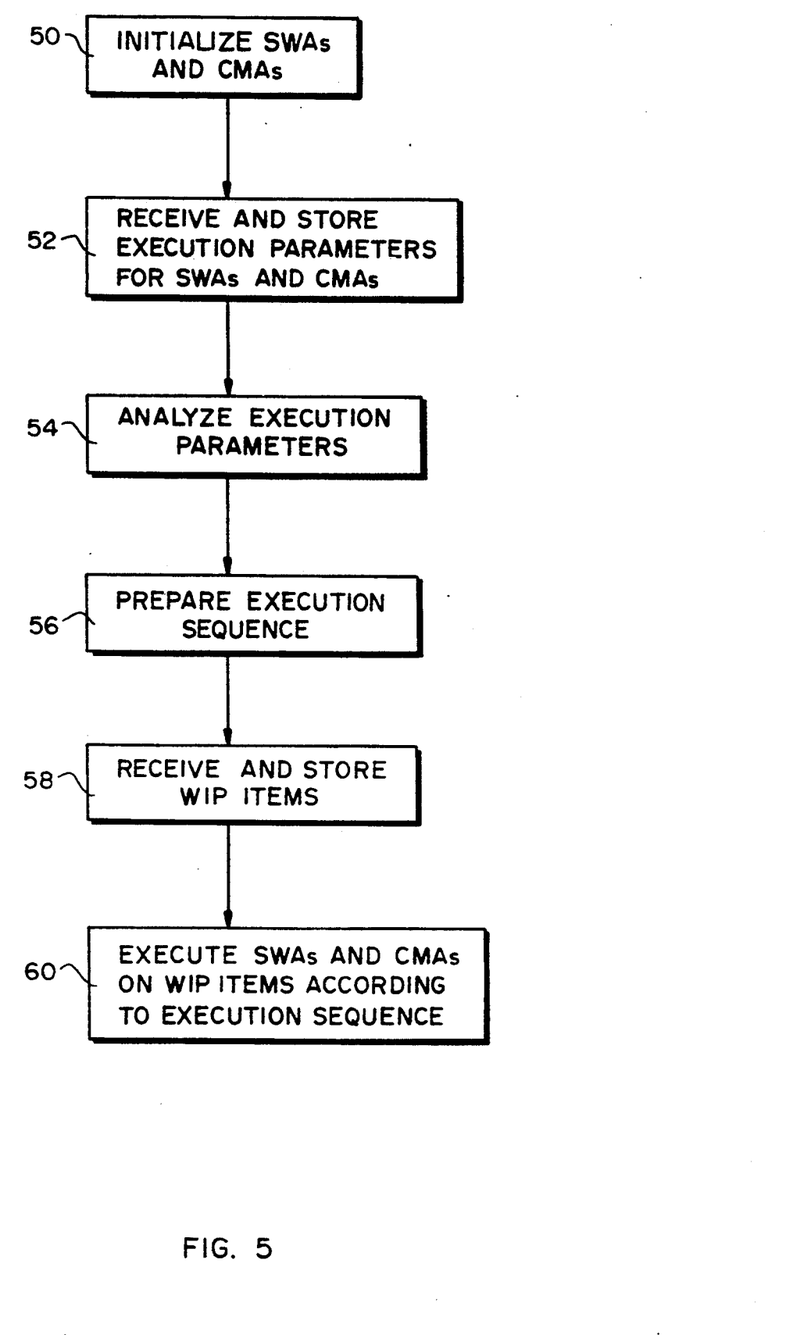
FIG. 5 is a flowchart that illustrates overall operation of the process of the present invention.

Refer, finally, to FIG. 5, which illustrates overall operation of the process of the present invention. At step 50, SWAs and CMAs are initialized. At step 52 data specifying execution parameters associated with each SWA and CMA is stored in system memory. Operation begins with analysis of the execution parameters at step 54, from which an execution sequence, specifying the order in which the SWAs and CMAs are to be executed, is derived in step 56. At this point the system is ready to receive WIP items (ordinarily, directly from a user) and store them in system memory, as indicated at step 58. Finally, at step 60, the SWAs and CMAs are executed according to the execution sequence, thereby implementing the user's workflow.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for defining, executing, monitoring and controlling the flow of business operations, the apparatus comprising:

a. at least one interface means for receiving information from a user;

b. storage means, coupled to the interface means, for electronically storing user-provided data representative of a work item;

c. instruction storage means for electronically storing a plurality of execution modules, each containing instructions that facilitate performance of a specified goal representing a business operation;

d. database storage means, coupled to the interface means, for storing a list of the execution modules that includes, with respect to each module, data specifying execution parameters associated with each module and an importance level associated with each parameter, said execution parameters related to at least one of (i) previous execution of at least one other specified module, (ii) specified place of module execution, (iii) specified duration of module processing, (iv) a specified time during which module execution may take place, and (v) a priority value associated with the module, wherein such execution parameters may be modified by a user via an interface means without disturbing the execution parameters associated with other modules;

e. at least one processor means capable of executing the stored instructions; and f. control means, coupled to the processor means and the storage means, for analyzing the execution parameters associated with the execution modules and, based on the importance levels, deriving therefrom an execution sequence for the modules, and directing the processor to sequentially execute the instructions contained in each module in the order specified by the execution sequence and on the work-item data.

2. The apparatus of claim 1 wherein execution by the processor means of at least some of the modules includes performance of specified operations by business personnel, and further comprising communication means, coupled to at least one interface means and the processor means, for receiving, via an interface means, notification of completion of the specified operations.

3. The apparatus of claim 1 wherein the processor means is further adapted for electronically associating a work item with a unique alphanumeric identifier, the processor and control means being adapted for simultaneous processing of multiple work items.

4. The apparatus of claim 3 wherein at any particular time, each module is executed with respect to a single identified work item.

5. The apparatus of claim 3 wherein at any particular time, each module can be executed with respect to a plurality of identified work items.

6. The apparatus of claim 1 wherein the parameters can be defined so as to require execution of a plurality of modules as a condition of executing a subsequent module.

7. The apparatus of claim 2, wherein the parameters include specification of at least one specified place at which a task required for execution of a module is performed.

8. The apparatus of claim 1 wherein the parameters include specification of the duration of processing attending execution of a module and specified times during which such execution can take place.

9. The apparatus of claim 6 wherein the parameters include a priority value associated with each module.

10. The apparatus of claim 1 further comprising means, coupled to at least one interface means, for enabling a user to modify the parameters associated with each module, thereby altering the order in which the modules are executed by the processor means.

11. A method for defining, executing, monitoring and controlling the flow of business operations represented by a plurality of electronically stored execution modules, each of which facilitates the performance of a specified goal representing a business operation, the method comprising:

a. receiving, via an interface means, electronically encoded data, representative of a work item, from a user;
b. electronically storing the work-item data in a first computer memory;
c. creating and electronically storing, in a second computer memory, a list of the execution modules that includes, with respect to each module, data specifying execution parameters associated with each module and importance level associated with each parameter, said execution parameters relating to at least one of (i) previous execution of at least one other specified module, (ii) specified place of module execution, (iii) specified duration of module processing, (iv) a specified time during which module execution may take place, and (v) a priority value associated with the module, wherein such execution parameters may be modified by a user via an interface means without disturbing the execution parameters associated with other modules;
d. analyzing the execution parameters associated with the execution modules and, based on the importance levels, deriving therefrom an execution sequence for the modules; and
e. electronically executing, by means of a computer processor, the instructions contained in each module in the order specified by the execution sequence on the work-item data.

12. The method of claim 11 wherein execution of at least some of the modules includes performance of specified operations by business personnel, and further comprising the step of electronically communicating, in accordance with the stored instructions, with business personnel to perform or obtain notification of completion of at least some of the specified business operations.

13. The method of claim 11 wherein the parameters can specify that execution of a plurality of modules is a condition of executing a subsequent module.

14. The method of claim 12 wherein the parameters can specify at least one specific place at which a task required for execution of a module may be performed.

15. The method of claim 11 wherein the parameters can specify the duration of processing attending execution of a module and designated times during which such execution can take place.

16. The method of claim 11 wherein the parameters can specify a priority value.

* * * * *